Patented Mar. 12, 1940

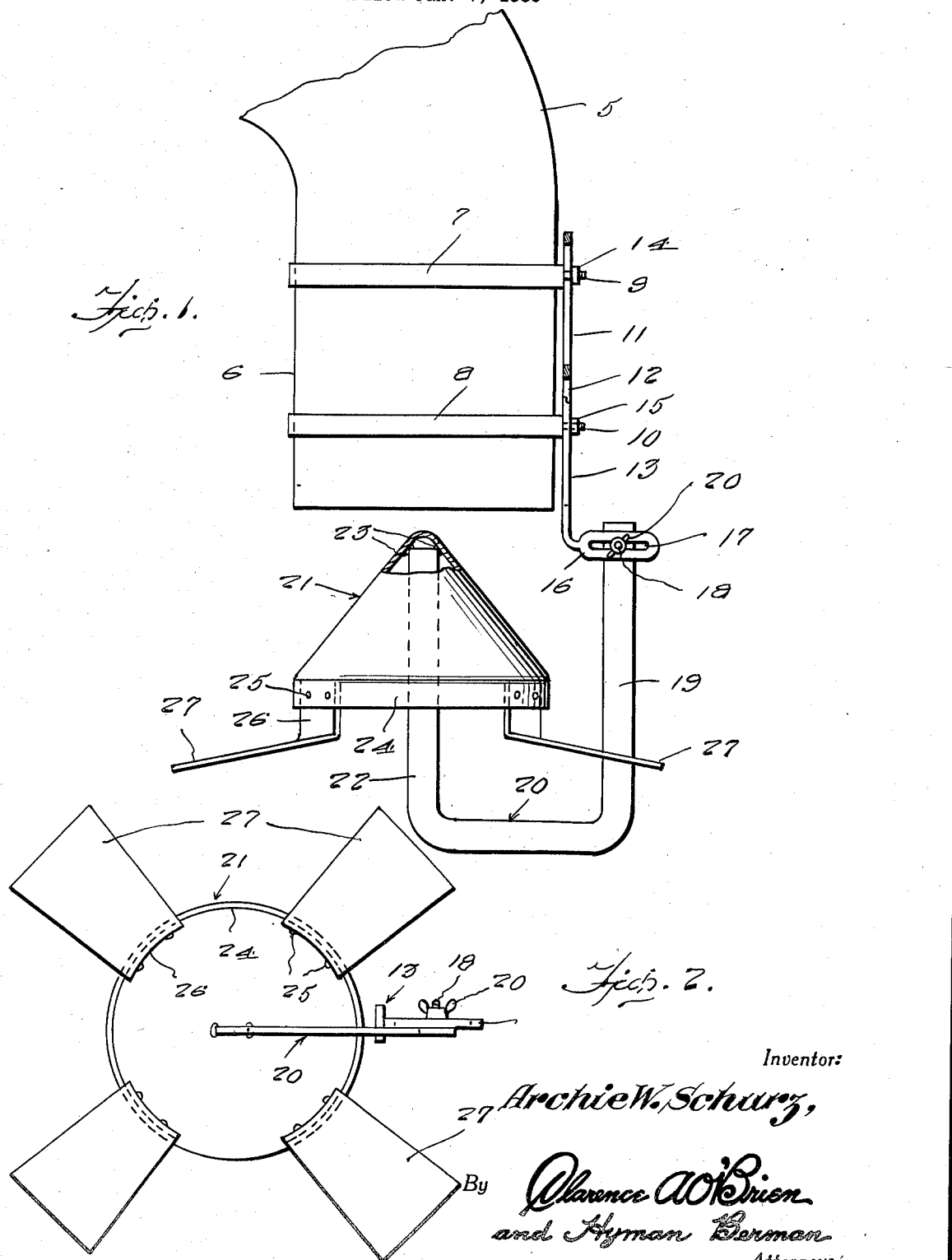

2,193,145

UNITED STATES PATENT OFFICE 2,193,145

SILAGE SPREADER

Archie W. Schurz, Bridgeport, Wis.

Application January 7, 1939, Serial No. 249,807

1 Claim. (Cl. 302—60)

My invention relates generally to a silage spreader to be mounted at the lower end of the delivery pipe which feeds the ensilage from the cutter into the silo, and an important object of my invention is to provide a simple and efficient arrangement of this character which is adequately adjustable, and which effects a proper and even distribution of the ensilage in the silo.

Other important objects and advantages of my invention will be apparent from a reading of the following description taken in connection with the drawing, wherein for purposes of illustration I have shown a preferred embodiment of my invention.

In the drawing:

Figure 1 is a general side elevational view showing the device of the invention mounted on the delivery pipe of the cutter and adjusted for even distribution of the ensilage into the silo (not shown).

Figure 2 is a bottom plan view of Figure 1.

Referring in detail to the drawing, the numeral 5 generally designates the ensilage delivery pipe which comes from the cutter and has a depending discharge end 6 which is positioned over the silo opening to feed the ensilage into the silo. In accordance with the present invention, there are secured one or more encircling bands 7, 8 around the exterior of the discharge end 6, from one side of which project clamping bolts 9, 10 which traverse respective vertically elongated slots 11 and 12 in a vertically elongated bracket 13. The nuts 14, 15 on the respective bolts 9 and 10 are adapted to be adjusted to loosen or clamp the bracket 13 in a selected vertically adjusted position.

The lower end of the bracket 13 has a lateral arm 16 which is provided with a horizontal slot 17 to receive the clamping bolt 18 on the upper end of the outer leg 19 of the U-shaped bracket 20. An adjustable wing nut 20' is carried by the bolt 18 for effecting clamping of the bracket 20 relative to the bracket 13, so as to enable adjustment of the spreader cone 21 to a position concentric with or non-concentric with the discharge end 6, to the amount provided by the length of the slot 17, and to provide for adjustment of the angularity of the cone 21 with respect to the axis of the discharge end 6, as may be necessary or desirable to bring about the most efficient distribution of the ensilage from the pipe 5 to the silo (not shown).

The inner leg 22 of the U-shaped bracket 20 has its upper end welded or otherwise secured as indicated by the numeral 23 to the interior of the apex of the hollow cone 21, and the hollow cone has a depending annular skirt 24 to the radially inward side of which are attached by suitable means designated by the numeral 25, the vertical parts 26 of radially arranged wings 27 which as a result extend in a slightly declining relation to the discharge end 6 as exhibited in Figure 1 of the drawing. The wings taper to a greater width at the radially outward ends thereof shown in Figure 2. While the cone 21 effects a good distribution of the ensilage in the silo, as the ensilage falls through the discharge end 6, the device being properly adjusted, the presence of the wings 27 effects much greater efficiency and evenness in the distribution and provides for additional control of the feed of the ensilage into the silo.

Although I have shown and described herein a preferred embodiment of my invention, it is to be definitely understood that I do not desire to limit the application of the invention thereto, and any change or changes may be made in the structure and arrangement of the parts, within the spirit of the invention and the scope of the subjoined claim.

Having described the invention, what is claimed as new is:

A distributor for use on the depending end of an ensilage delivery pipe comprising a pair of hoops for attachment to said end in vertically spaced relation, a bar-like hanger bracket mounted on said hoops to depend therefrom alongside said end and vertically adjustable on said hoops, a conical hollow spreader, and means to mount said spreader on the hanger bracket below said end of the pipe for tilting into and out of coaxial relation to said end and for lateral adjustment independently of tilting and comprising a U-shaped support for said spreader having one leg extending upwardly into the spreader and fixed to the same at the apex thereof, the other leg of the support being pivotally and slidably mounted on the lower end of said bracket.

ARCHIE SCHURZ.